May 14, 1968  A. C. JASON ET AL  3,383,218
THAWING FROZEN FOODS
Filed Sept. 13, 1965
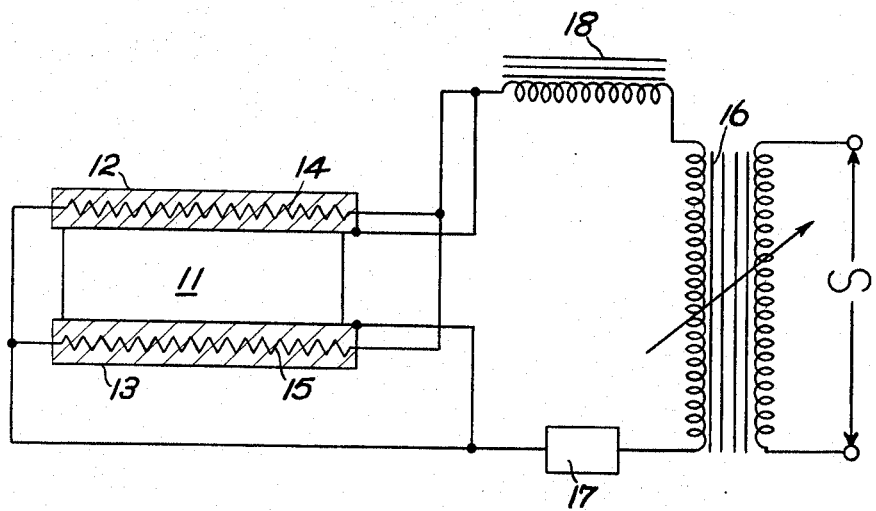
Inventors
Alfred C. Jason
Herbert R. Sanders
By
Watson, Cole, Grindle & Watson
Attys.

United States Patent Office

3,383,218
Patented May 14, 1968

3,383,218
THAWING FROZEN FOODS
Alfred C. Jason and Herbert R. Sanders, Aberdeen, Scotland, assignors to The Minister of Technology, London, England, a corporation sole
Filed Sept. 13, 1965, Ser. No. 486,708
Claims priority, application Great Britain, Sept. 16, 1964, 37,919/64; May 25, 1965, 22,138/65
2 Claims. (Cl. 99—111)

ABSTRACT OF THE DISCLOSURE

A method for thawing blocks without cooking of edible material frozen to a temperature at which such blocks present a relatively high resistance to the passage of electrical current therethrough by contacting two opposite faces of a frozen block each with one of two plate electrodes and supplying heat to both electrodes while in contact with the block to cause thermal conduction heating of the block until the block presents low resistance to electrical current flow therethrough, and then continuing to thaw the block by passing current between the electrodes.

---

This invention relates to the thawing of frozen materials particularly foods, e.g. fish, in the form of blocks of generally uniform thickness.

It has previously been proposed to effect the thawing of such blocks by passing therethrough an alternating current the potential of which is regulated so that the mean rate of dissipation of energy per unit volume is insufficient to give rise in the block to progressive localised overheating but is preferably maintained at or substantially at a rate consistent with this requirement. The current is supplied by the aid of electrodes of corrosion-resistant metal, preferably stainless steel, applied over the whole area of the two opposite largest surfaces of the block.

Below a certain temperature (about −5° C. in the case of frozen fish) the resistance of the block is so high that it is preferable to heat the blocks up to this temperature by absorption of external heat before subjecting the blocks to resistance heating, and it was proposed to effect such heating by passing them through a preliminary heating zone such as a water spray, a radio-frequency oven or a tunnel through which air at room temperature is circulated.

According to the present invention the electrodes themselves are heated so that they supply heat by conduction in addition to serving to convey current for resistance thawing. This thermal conductive heating is discontinued towards the end of the thawing process because as thawing proceeds the rate of thermal conduction is reduced progressively while the electrical conductivity rises and if heating of the electrodes is sustained too long the surfaces of the block become overheated. As before the current is regulated to avoid progressive localised overheating.

The electrodes may be heated in any convenient way but electrical heating is preferred because it is convenient and then only a single supply of electricity is needed for both forms of heating. A very suitable arrangement comprises a heating element of insulated cable form sandwiched between a pair of corrosion resistant metal, preferably stainless steel, plates for each electrode, the element being set in a sinuous or similar pattern to effect substantially uniform heating at the surface of the block. The accompanying drawings diagrammatically illustrate this construction of the electrodes and a suitable circuit; the supply for resistance heating may be regulated by the means disclosed in the aforesaid application.

With a uniform heating of the block by means of uniformly heated electrodes a planar heat front travels into the block from each electrode with the result that the variation in resistance of the material of the block as its temperature rises is also uniform so that the current flowing between the electrodes is uniformly distributed and does not tend to concentrate in localised regions to produce local overheating.

The efficiency with which thawing is effected by the current passing through the block is also affected by the frequency of the alternating current flowing between the electrodes and its magnitude and that for different materials to be thawed different frequencies and magnitudes may produce optimum efficiency in the different cases. It is therefore preferable to arrange for both the frequency and the magnitude of the accompanying alternating current supplies to the electrodes to be controllable to enable optimum efficiency to be obtained by adjustment of one or both these parameters.

The following table summarises the procedure in two typical cases of application of the method of the invention to the thawing of frozen fish:

| Fish | Boned herring | White fish fillets |
|---|---|---|
| Block size (inches) | 15 x 10 x 1⅝ | 15 x 8 x 1⅝ |
| Block weight (lb.) | 7.5 | 7.2 |
| Total plate power (W) | 300 | 300 |
| Potential applied to block (volts r.m.s.) | 42 | 26 |
| Duration of simultaneous resistance and thermal conduction heating (minutes) | 25 | 30 |
| Duration of additional resistance heating (minutes) | 5 | 12 |
| Energy supplied to heater plates (kW minutes) | 7.5 | 9.0 |
| Energy for resistance heating (kW minutes) | 2.4 | 3.1 |

An example of apparatus in accordance with the invention is illustrated diagrammatically in the accompanying drawing. In this drawing 11 indicates a block of frozen food that is to be thawed, and 12 and 13 are electrode plates making electrical contact with such block. Each electrode has included in its structure an electrical resistance element, 14, 15. Power is supplied by a transformer 16, the voltage output of which is variable to control the current flowing through the block. A cut-out 17 interrupts the transformer circuit if excessive current is drawn. The electrode plates are connected each to a pole of the transformer secondary as also are the resistance elements 14, 15. These have been shown in parallel with one another, but they could equally well be connected in series if their dissipation is made of suitable magnitude. It has been found convenient to limit the power concentration due to the resistance elements in the electrodes to about one watt per square inch maximum. For example, in thawing a block of frozen herring 10″ x 15″ x 1⅝″ the maximum power of each resistance element would be 150 watts.

Where fish is concerned, below −5° C. the resistance of the frozen block is relatively high and the more effective means of thawing is by conduction from the heated electrodes. Around −5° C. the resistance of the block begins to fall rapidly and the more effective means of thawing is by conduction of electricity through the block. If the flow of heat from the heated electrodes remains unabated, hot spots may be set up with consequent local run-away heating. This is avoided automatically by placing a reactor 18 in series with the transformer secondary. When the resistance of the block 11 begins to fall considerably the current through it rises and produces a voltage drop across the reactor 18. Hence a reduced voltage is available for the elements 14, 15 the resistance of which remains substantially constant and less heat is dissipated by them. By suitable choice of the inductance and the reactor 18 a rough approximation to constant heat input as the fish resistance falls can be obtained. By varying the frequency of the alternating current input to transformer 16 the optimum value for efficient heating of the particular material of the block being thawed.

We claim:

1. A method of thawing blocks without cooking of edible material frozen to a temperature at which such blocks present a relatively high resistance to the passage of electrical current therethrough, said method comprising contacting two opposite faces of a frozen block each with one of two plate electrodes, and supplying heat to said two electrodes while in contact with the block to cause thermal conduction heating of the block until said block presents relatively low resistance to electrical current flow therethrough, then continuing to thaw the block by passing electrical current between the electrodes and through the block to cause electrical conduction heating of the material of the block, the supplying of heat to the electrodes being effected by supplying electrical energy to generate heat in the electrodes, and applying electrical energy from a common source both directly to said electrodes to cause said electrical conduction heating and to electrical heating elements embodied in said electrodes to cause said thermal conduction heating, the application of energy being so controlled that during thermal conduction heating the energy is preponderantly supplied to said heating elements and during electrical conduction heating said energy is preponderantly supplied directly to said electrodes.

2. A method of thawing, without cooking a block of edible material having at least two opposite flat faces and which is frozen to a temperature at which such block presents a relatively high resistance to the passage of electrical current therethrough, said method comprising intimately contacting the whole of the area of each of said two flat opposite faces of the block each with one of two flat opposite faces of the block each with one of two flat plate electrodes, supplying electrical energy from a common source to said electrodes while in intimate contact with the block both directly to said electrodes to cause electrical conduction heating and to electrical heating elements embodied in said electrodes to cause thermal conduction heating, and controlling the application of said electrical energy that initially the energy is preponderantly supplied to said elements to cause thermal conduction heating of said block until said block presents relatively low resistance to electrical current flow therethrough and then the energy is preponderantly supplied directly to the electrodes to cause current to flow between the electrodes and through the block to produce electrical conduction heating of the material of the block in continuance of the thawing process initiated by said thermal conduction heating of the block.

References Cited
UNITED STATES PATENTS

| | | | |
|---|---|---|---|
| 1,380,656 | 6/1921 | Lauth | 99—358 |
| 1,485,755 | 3/1924 | Alcock | 99—358 X |
| 2,107,931 | 2/1938 | Brown | 99—358 X |
| 2,159,361 | 5/1939 | Atkinson et al. | 13—6 |
| 2,200,406 | 5/1940 | Watson | 99—358 |
| 2,226,036 | 12/1940 | Watson | 99—358 |
| 2,244,267 | 6/1941 | Slayter et al. | 13—6 |
| 2,280,101 | 4/1942 | Slayter et al. | 13—6 |
| 3,098,426 | 7/1963 | Lee, Sr. | 99—358 X |
| 3,117,511 | 1/1964 | Everett | 99—358 X |

RICHARD M. WOOD, *Primary Examiner.*

C. L. ALBRITTON, *Assistant Examiner.*